July 29, 1941.  B. G. JUTTING  2,250,484

ROTARY ENGINE

Filed March 2, 1939  3 Sheets-Sheet 1

INVENTOR.
Bernhard G. Jutting
BY Benjamin Webster
ATTORNEY.

July 29, 1941.  B. G. JUTTING  2,250,484
ROTARY ENGINE
Filed March 2, 1939  3 Sheets-Sheet 2
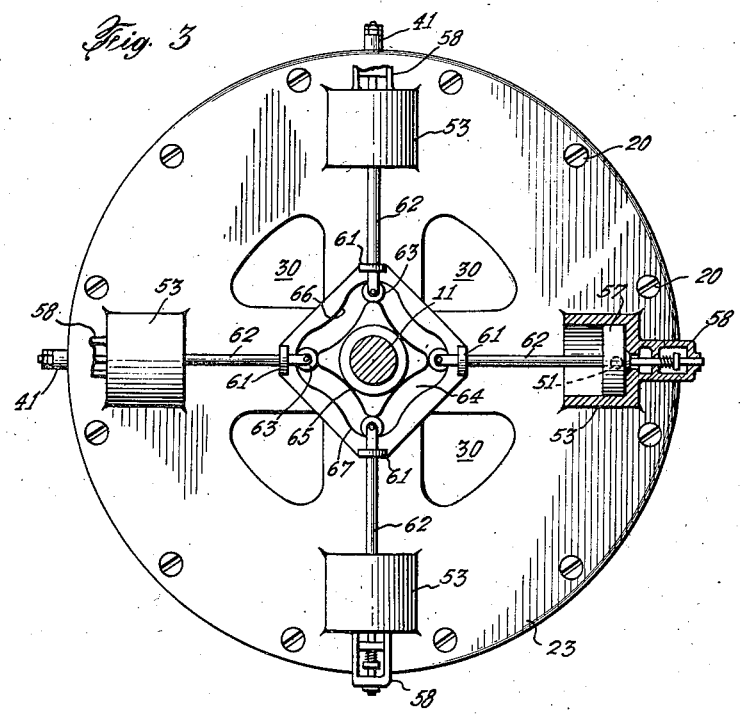
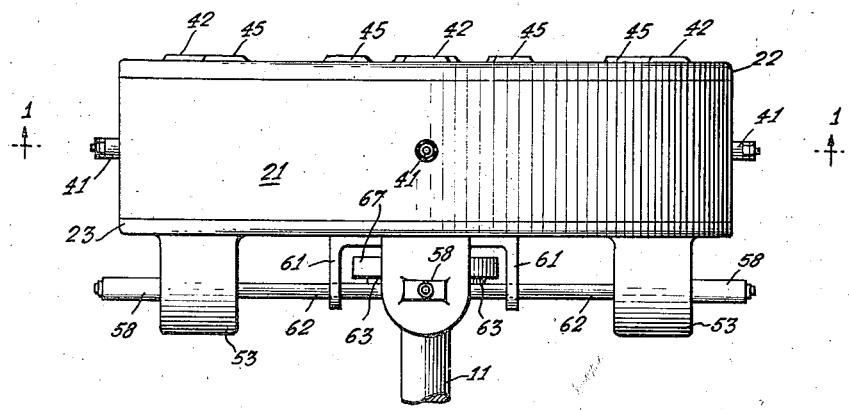
INVENTOR.
Bernhard G. Jutting
BY Benjamin Webster
ATTORNEY.

July 29, 1941.　　B. G. JUTTING　　2,250,484
ROTARY ENGINE
Filed March 2, 1939　　3 Sheets-Sheet 3
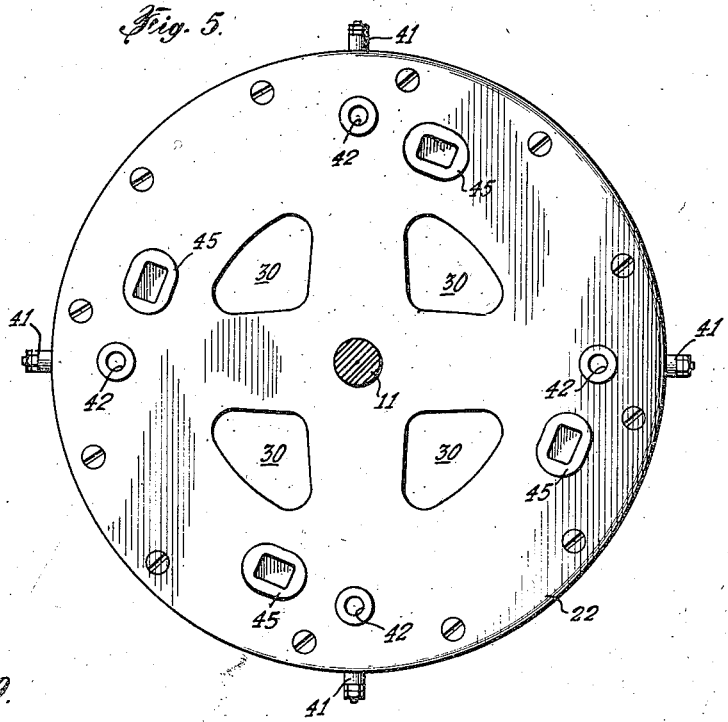
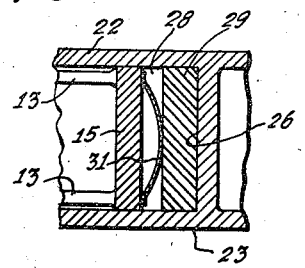
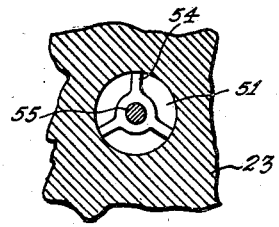
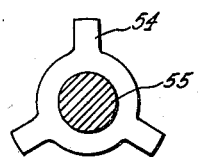
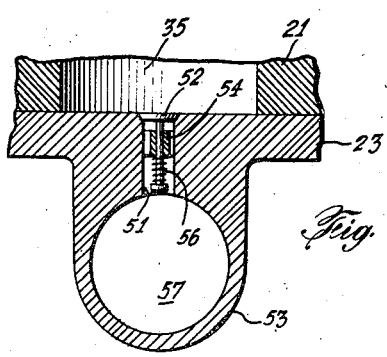
INVENTOR.
Bernhard G. Jutting
BY Benjamin Webster
ATTORNEY.

Patented July 29, 1941

2,250,484

UNITED STATES PATENT OFFICE 2,250,484

ROTARY ENGINE

Bernhard G. Jutting, New Brunswick, N. J.

Application March 2, 1939, Serial No. 259,330

3 Claims. (Cl. 123—15)

This invention relates to rotary internal combustion engines of the Diesel type.

It is an object of the invention to provide a thin, compact, simple, efficient, and durable rotary engine of low manufacturing cost that develops a high rate of horse power in proportion to its size.

A feature of the invention is a rotary engine with a small number of spring-operated valves, especially in the operative parts of the rotary engine, thereby enhancing the durability of the engine by eliminating springs.

A feature of the invention is the provision of a circumferential chamber which is divided by parts of the rotor into a plurality of equidistant expansion chambers whose position is changed continuously by the rotation of the rotor, which rotation in one embodiment of the invention is clockwise. The invention is also applicable to an engine that rotates counterclockwise.

A feature of the invention is the provision of precombustion chambers in the fixed casing that have lever valves pivoted to swing under the explosion pressure into the expansion chambers and to close said chambers at the rear in order to direct expansion pressure against projections on the rotor, which close the forward ends of the chambers. Camming surfaces on the front side of each projection close the lever valves and the precombustion chambers prior to the injection thereinto of fuel and compressed air, fuel at one end of each precombustion chamber from a standard fuel or Diesel oil pressure pump, and compressed air at the opposite end through pressure valves in the conduit from piston pumps, the pistons of which are reciprocated by cams mounted on the engine shaft. The rear walls of the projections are walls curved by a radius larger than that of the valves so that knocking of the engine at these points is eliminated. The pressure valves open at specific pressures related to the piston operation. On relatively low-pressure engines spark plugs are used to ignite the mixtures in the precombustion chambers synchronously with the release of the pivoted valves by the projections on the rotor. Glow plugs may be used where required. Exhaust ports connect with the top of the expansion chambers synchronously with the opening of the succeeding expansion chambers and the rotating projections on the rotor scavenge the combustion gases ahead of them therethru. A suitable exhaust manifold may connect the exhaust ports. The interior of the rotor is open for air circulation and the casing is provided with a water-circulatory system. Spring-pressed sealing gaskets compensate for minute variations in the position of the projections on the rotor with reference to the inner cylindrical wall of the fixed casing which also forms the outer wall of the expansion chambers. Lubrication of the engine valves between the precombustion and expansion chambers is provided by the fuel oil itself. The explosion in all the precombustion chambers is simultaneous. The hinges of the valves into the expansion chambers are so constructed that the cylindrical recess that receives the pivoted edge of the hinge is the pivotal bearing for the partially cylindrical edge of the hinge. Access to the engine is had thru side plates secured to the casing by screws. The air-compression pumps are radially disposed with the pistons each directly engaging an operative cam mounted on the rotor shaft. The engine is perfectly balanced for efficient operation in any position thereof, horizontal, vertical, or oblique.

Reference is made to the drawings illustrating one embodiment of the invention in which, Figure 1 is a central section taken on the line 1—1 of Figure 4 and looking in the direction of the arrows.

Figure 3 is a front view partially in section.

Figure 4 is a top view.

Figure 5 is a rear view.

Figure 6 is a section taken on the line 6—6 of Figure 2 looking in the direction of the arrows.

Figure 7 is a section through the air ports into the precombustion chambers.

Figure 8 is a similar view enlarged.

Figure 9 is a section taken on the line 9—9 of Figure 1 looking in the direction of the arrow.

Figure 1:
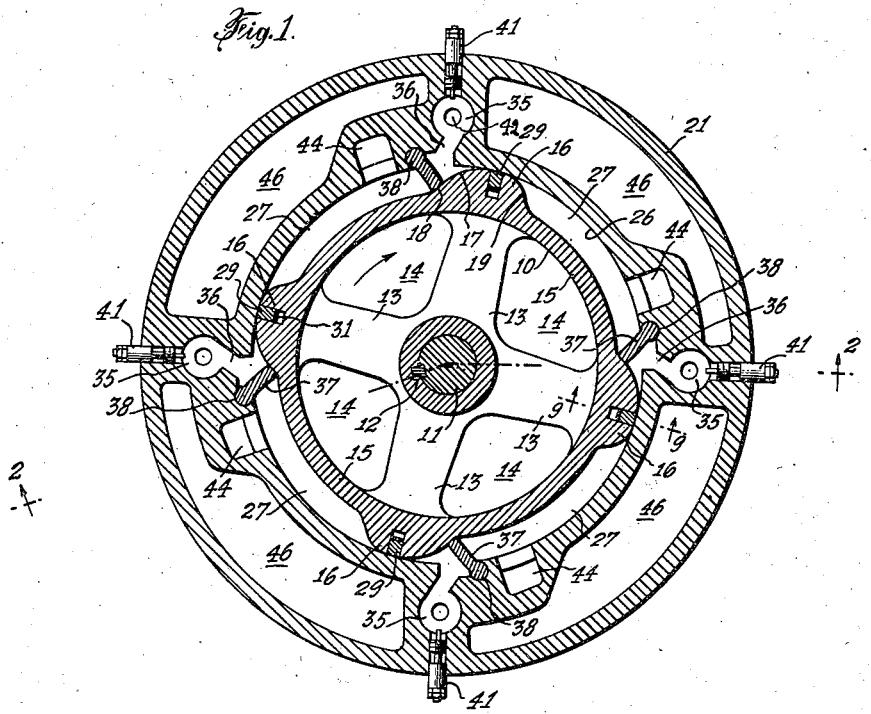
Figure 2:
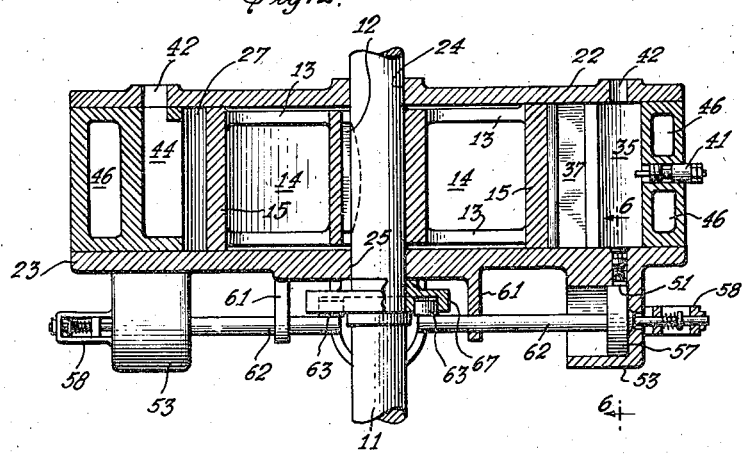
Figure 2 is a section taken on the line 2—2 of Figure 1 looking in the direction of the arrows.

A rotor 10 is cylindrical in form and is secured to rotate on a power shaft 11 by means of a key 12. Spokes 13 connect the hub and the periphery of the rotor 10 and provide air spaces 14 for the circulation of air inside the rotor and at their extremities the spokes 13 mount a cylindrical peripheral wall 15 on which are equidistant similar convex transverse projections 16, which extend outwardly radially and have on the left side, as viewed in Figure 1, a convexly curved wall 17 provided at its base with a concavely curved wall 18 which is curved in a circle larger than that defined by the end of a valve lever mounted in the surrounding casing. Each projection 16 has on the right, as viewed in Figure 1, or the forward side considered with reference to the direction of rotation of the rotor 10, a convexly curved wall 19.

A cylindrical casing 21 is suitably mounted where desired in a horizontal, a vertical, or any other position. This casing 21 is relatively thin and compact. A plate 22 is fixed on the back of the casing 21 by screws 20 or any other suitable fastening means, and a plate 23 is fixed on the front side of the casing 21 by screws 20, or any other suitable fastening means. The plates 22 and 23 sealingly engage the sides of the peripheral wall 15 of the rotor 10. Plate 22 has a central aperture 24 and plate 23 has a central aperture 25, which together form a cylindrical bearing in which the shaft 11 is rotatable. The casing 21 has an inner cylindrical wall 26 which is spaced from the outer peripheral wall 15 of the rotor 10, which provides an arcuate space between adjacent projections 16, which are equally spaced around the rotor 10 so that the spaces between the walls 26 and 15 are equal in number and size to provide expansion chambers 27 whose positions around the circumference vary continuously with the rotation of the rotor 10. A slot 28 in each projection 16 mounts a sealing bar 29 which is slidable radially in the slot to engage the wall 26 and which extends transversely across the expansion chamber 27. A curved flat spring 31 is mounted in the bottom of each slot and holds the sealing bar 29 in spring-pressed contact with the inner cylindrical wall 26 of the casing 21.

Precombustion chambers 35, four in number, one corresponding to each projection 16, are spaced equidistantly in the casing 21 and extend transversely thereof and each chamber 35 opens through a transverse slot or port 36 into the adjoining expansion chamber 27 in a direction opposite to the direction of rotation of the rotor 10. Lever valves 37 have their upper edges partially cylindrical in form and are mounted in transverse cylindrical recesses 38 that form bearings in which they turn pivotally from the outer position in which they close the apertures 36 into the expansion chambers 27 to the inner position in which they close the expansion chambers 27 at the rear or opposite end to the direction of rotation. The bottom of each lever valve 37 engages the bottom of each expansion chamber 27 to prevent the passage of air or gas to the rear and therefore directs expansion forward against the wall 17 of the adjacent protuberance 16. The spark plugs 41 are inserted on the outside of the casing 21 and project into the central portion of each precombustion chamber 35. Ports 42 formed in the plate 22 at the ends of each precombustion chamber 35 connect with a standard Diesel fuel pump, which is not shown. As viewed in Figure 1, exhaust ports 44 are mounted to the left of the valves 37 in the casing 21 and connect with ports 45 in the wall 22 of the casing, which in turn connect with any suitable exhaust manifold, which is not shown. Spaces 46 formed within the casing 21 are interconnected circumferentially and provide for a water cooling jacket, which may be connected up in any known way. Ports 51 in the plate 23 connect with the ends of the precombustion chambers 35 opposite to the fuel ports 42 and in each port 51 is mounted a spring pressure valve 52 seated on the inner end of the port and which permits the entrance of compressed air into the chambers 35, from the piston chambers 53, at a predetermined pressure.

Referring to Figures 6, 7 and 8, small spiders 54 in the ports 51 slidably support the shafts 55 of the valves 52, and coil springs 56, mounted between the heads of the shafts 55 and the spiders 54, resiliently hold the valves 52 on their seats. Cylindrical pistons 57 are reciprocable radially in the chambers 53 and as each piston 57 is moved inwardly atmospheric air is sucked in through a spring valve 58 which is mounted on the outer radial wall of each chamber 53. Radially disposed and perpendicularly projecting arms 61 are mounted centrally of the plate 23 and are apertured at the outer ends in line with the piston shafts 62 to support them as they are radially reciprocated. Rollers 63 are mounted on pins extending at right angles from the inside of each piston shaft 62 and run in a track 64 which is formed by oppositely disposed camming walls 65 and 66 projecting outwardly on a piece 67 which is mounted to turn with the shaft 11. It is obvious that as the track 64 rotates the piston shafts 62 are moved outwardly and inwardly.

*Mode of operation.*—While the valves 37 are closed the precombustion chambers 35 are charged with fuel and compressed air under pressure, but concurrently with the release of the valves, or their clearance by projections 16, the sparks ignite the compressed fuel-air mixture, the valves 37 swing open under pressure into and to close the expansion chambers 27 to the rear and the explosive mixtures exert pressure on the walls 17 of the projections 16 to cause the rotor 10 and the power shaft 11 to turn clockwise in the embodiment shown in the drawings. Expansion of the gases continues in the chambers 27 until the projections 16 have passed and have opened the exhaust ports 44 and the next succeeding projections, 16 by means of their walls 19 engage the valves 37 to cam them into closed position.

Having shown and described a preferred embodiment of my invention, and realizing that many changes will readily occur in details of construction to mechanics skilled in the art in view of my disclosure, I do not limit myself except as in the appended claims.

I claim:

1. An engine of the fuel oil type comprising a cylindrical casing; a plurality of equally spaced precombustion chambers formed in said casing; a central bearing in the casing; a shaft rotatingly mounted in said bearing; a rotor keyed to the shaft; a plurality of expansion chambers formed in the exterior of the rotor and adjacent to the inner wall of the casing; ports leading from the precombustion chambers to the expansion chambers, said ports being smaller in cross-section than the precombustion chambers to properly mix the compressed fuel and air for combustion; hinged valves in said ports; exhaust ports leading from the expansion chambers; the periphery of the rotor being formed with equidistant protuberances having ways on opposite sides camming surfaces; the valves for closing the ports from the precombustion chambers to the expansion chambers being so mounted that they are closed by the protuberances, fuel-oil inlets in said precombustion chambers, air inlets in said precombustion chambers, valves in said air inlets, compression chambers connecting with said air inlets, pistons reciprocable in said compression chambers to compress the air therein, and air inlets into said compression chambers having valves therein operative when the pistons are retracted.

2. An engine of the fuel oil type comprising a cylindrical casing; a plurality of equally spaced precombustion chambers formed in said casing; a central bearing in the casing; a shaft rotatingly mounted in said bearing; a rotor keyed to the shaft; a plurality of expansion chambers formed in the exterior of the rotor and adjacent to the inner wall of the casing; ports leading from the precombustion chambers to the expansion chambers; valves in said ports hinged on the side of said ports opposite to the direction of rotation; exhaust ports leading from the expansion chambers; the periphery of the rotor being formed with equidistant protuberances having on opposite sides camming surfaces; the valves for closing the ports from the precombustion chambers to the expansion chambers being so mounted that they are closed by camming surfaces on the protuberances, the opposite camming surfaces tending to check the opening of the valves and being defined by a section of a cylinder whose radius is longer than the length of the valves so that knocking of the engine at this point is reduced, fuel-oil inlets in said precombustion chambers, air inlets in said precombustion chambers, valves in said air inlets, compression chambers connecting with said air inlets, pistons reciprocable in said compression chambers to compress the air therein, and air inlets into said compression chambers having valves therein operative when the pistons are retracted.

3. An engine of the fuel oil type comprising a cylindrical casing; a plurality of equally spaced precombustion chambers formed in said casing; a central bearing in the casing; a shaft rotatingly mounted in said bearing; a rotor keyed to the shaft; a plurality of expansion chambers formed in the exterior of the rotor and adjacent to the inner wall of the casing; ports leading from the precombustion chambers to the expansion chambers; valves in said ports hinged on the side of said ports opposite to the direction of rotation and closing the expansion chambers in the open position of the valves; exhaust ports leading from the expansion chambers; the periphery of the rotor being formed with equidistant protuberances having on opposite sides camming surfaces; the valves for closing the ports from the precombustion chambers to the expansion chambers being so mounted that they are closed by camming surfaces on the protuberances, the opposite camming surfaces tending to check the opening of the valves and being defined by a section of a cylinder whose radius is longer than the length of the valves and an oppositely curved wall between each of said opposite camming surfaces and the normal circumference of the rotor which is also a section of a cylinder whose radius is greater than the length of the valves whereby knocking of the valves is eliminated, fuel-oil inlets in said precombustion chambers, air inlets in said precombustion chambers, valves in said air inlets, compression chambers connecting with said air inlets, pistons reciprocable in said compression chambers to compress the air therein, and air inlets into said compression chambers having valves therein operative when the pistons are retracted.

BERNHARD G. JUTTING.